United States Patent [19]

Kadlicko

[11] Patent Number: 5,313,875
[45] Date of Patent: May 24, 1994

[54] PISTON WITH SUPPORT MEMBER AND BEARING

[75] Inventor: George Kadlicko, Mississauga, Canada

[73] Assignee: 814405 Ontario Ltd., Canada

[21] Appl. No.: 975,426

[22] Filed: Nov. 12, 1992

[51] Int. Cl.⁵ .............................................. F01B 31/10
[52] U.S. Cl. ...................................... 92/157; 92/158; 92/160; 92/165 R; 92/186; 92/187; 92/255; 92/257; 123/193.6
[58] Field of Search ................ 92/153, 157, 158, 159, 92/160, 186, 187, 175, 165 R, 255, 257; 123/193.6

[56] References Cited

U.S. PATENT DOCUMENTS

| | | | |
|---|---|---|---|
| 920,165 | 5/1909 | Marcil | 92/158 |
| 984,250 | 2/1911 | Wiesner | 92/187 |
| 1,106,702 | 8/1914 | Erskine | 92/159 |
| 1,774,219 | 8/1930 | Ackerman | 92/187 |
| 3,136,306 | 6/1964 | Kamm | 92/955 |
| 4,672,921 | 6/1987 | Quaglino, Jr. | 92/157 |

FOREIGN PATENT DOCUMENTS

| | | | |
|---|---|---|---|
| 0881591 | 5/1953 | Fed. Rep. of Germany | 92/187 |
| 0102982 | 1/1917 | United Kingdom | 92/187 |

*Primary Examiner*—Thomas E. Denion
*Attorney, Agent, or Firm*—Ladas & Parry

[57] ABSTRACT

A piston for an internal combustion engine has a crown and peripheral wall to carry a piston ring. A support extends between the wall and a bearing housing to receive the connecting rod. A cylindrical support member also extends from the wall around the support to a skirt. The support member is radially inset from the wall and a cylindrical bearing member is located on its radially outer surface.

8 Claims, 4 Drawing Sheets

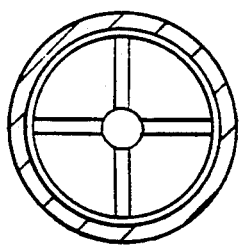
FIG. 5
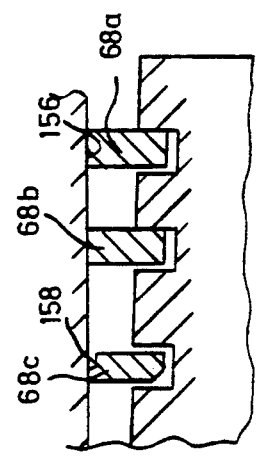
FIG. 6
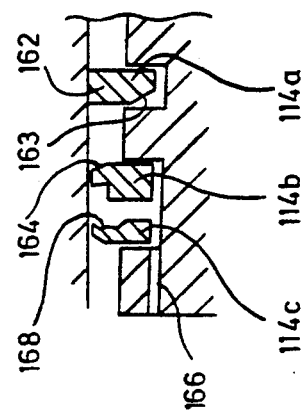

PISTON WITH SUPPORT MEMBER AND BEARING

The present invention relates to pistons for internal combustion engines.

The vast majority of internal combustion engines utilize a piston reciprocating within a cylinder to convert the thermal energy produced by the combustion of fuel into mechanical energy. The sliding motion of the piston within the cylinder is therefore critical to the performance of the engine, but must also meet a number of conflicting requirements. On the one hand, the piston must be free to slide within the cylinder, and on the other hand, the piston must effectively seal the combustion products within the cylinder which necessitates a close fit between the piston and cylinder. The piston is also subjected to the combustion process and so has to be capable of withstanding the high temperatures and pressures inherent in that process.

Failure to support the piston adequately leads to poor sealing performance and also rapid wear of the cylinder wall. Various attempts have been made to allow proper sliding motion whilst maintaining an adequate seal, some of which have utilized low friction coatings of the cylinder and piston. Such coatings have increased performance of pistons, but further improvements in the sliding performance and support for the piston is desirable.

In general terms, the present invention provides a piston having a crown and a cylindrical wall extending around the crown. A support member is disposed inwardly of the cylindrical wall and extends to an annular skirt portion at the lower end of the piston. A circumferential recess is thus provided between the crown and the skirt and a sleeve of bearing material is located in the recess and supported by the support member. A bearing support for connecting the connecting rod to the piston is located within the support member and connected to the cylindrical wall.

The crown and the cylindrical wall can thus be formed from high performance materials and the cylindrical brush made from a suitable bearing material which enhances the sliding motion within the cylinder. Loads are transferred through the cylindrical wall to the bearing support without subjecting the bearing material to such loads.

An embodiment of the invention will now be described in reference to the accompanying drawing in which FIG. 1 is a side view in section of a reciprocating piston internal combustion engine.

FIG. 5 is a view on the line 5—5 of FIG. 2.

FIG. 6 is an enlarged view of a portion of the piston shown in FIG. 2.

Figure 1:
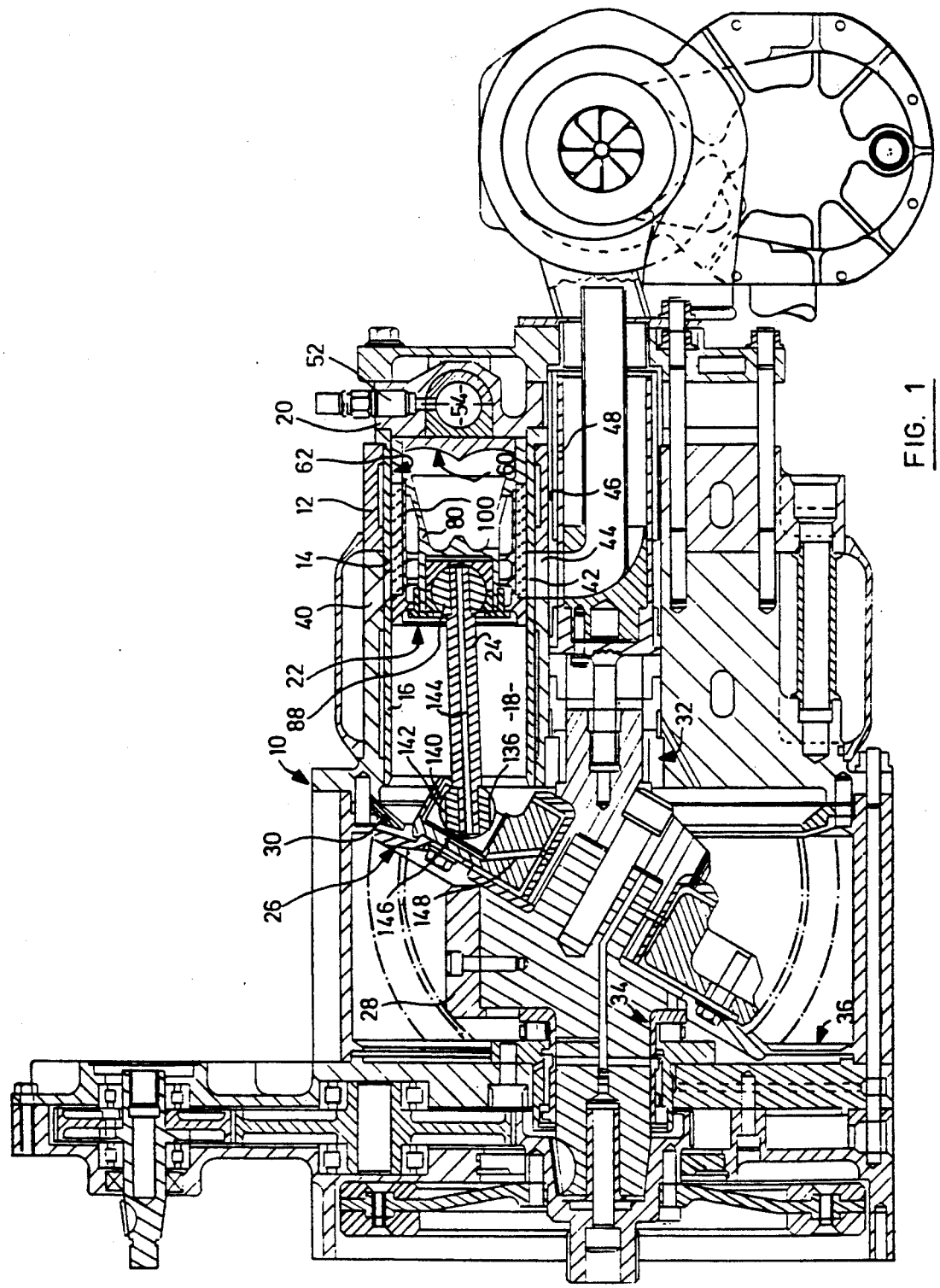

Referring, therefore, to FIG. 1, a reciprocating piston internal combustion engine 10 includes a cylinder block 12 having a plurality of parallel internal bores 14. A liner 16 is located in each bore to define a cylinder indicated at 18. A cylinder head 20 is attached to the engine block 12 to seal one end of each cylinder 18.

A piston 22 is located within each cylinder 18 and is connected by a connecting rod 24 to a nutating gear 26 rotatably mounted on a crank shaft 28. The nutating gear 26 engages a stationary gear 30 secured to the engine block 12. The crankshaft 28 is rotatably supported by bearing assemblies 32,34 one of which, 32 is located in the cylinder block and the other of which, 34 is located in the crank case 36. The arrangement of connecting rod 24, nutating gear 26, stationary gear 30 and crankshaft 28 form a nutating or wobble drive such as is well known in the art and will not be described further. It will be apparent that longitudinal force is exerted through the connecting rod 24 from the piston 22 induces rotation of the crankshaft 28 to provide a useful output torque.

Combustion air for the cylinders 18 is provided through an inlet manifold 38 and inlet ports 40 provided in the block 12 and the liner 16, respectively. Combustion products are expelled from the cylinder 18 through an outlet port 42 and an exhaust passageway 44. The passageway 44 communicates with a central exhaust duct 46 having a rotatable sleeve 48 secured to the crank shaft 28. The sleeve 48 includes an inlet port 50 that allows communication between the outlet port 42 and the interior of the sleeve 48 to allow combustion products to be expelled. The arrangement of the exhaust duct and the rotatable sleeve 48 is shown more fully in a co-pending application filed on even date herewith and will not be described in further detail. It will be appreciated as crankshaft 28 rotates, the exhaust valve successively connects the interior of the sleeve 48 with the passageways 44 to allow exhaust gases to be expelled.

Fuel is supplied to the cylinder 18 through an injector 52 located in a combustion chamber 54. The fuel is injected as the piston 22 approaches the cylinder head 20 to initiate combustion and force the piston 22 along the cylinder 18. It will be appreciated that fuel is injected to each of the cylinders 18 in a timed sequence to provide a progressive and successive phasing of the movement of the pistons within their respective cylinders.

Figure 2:
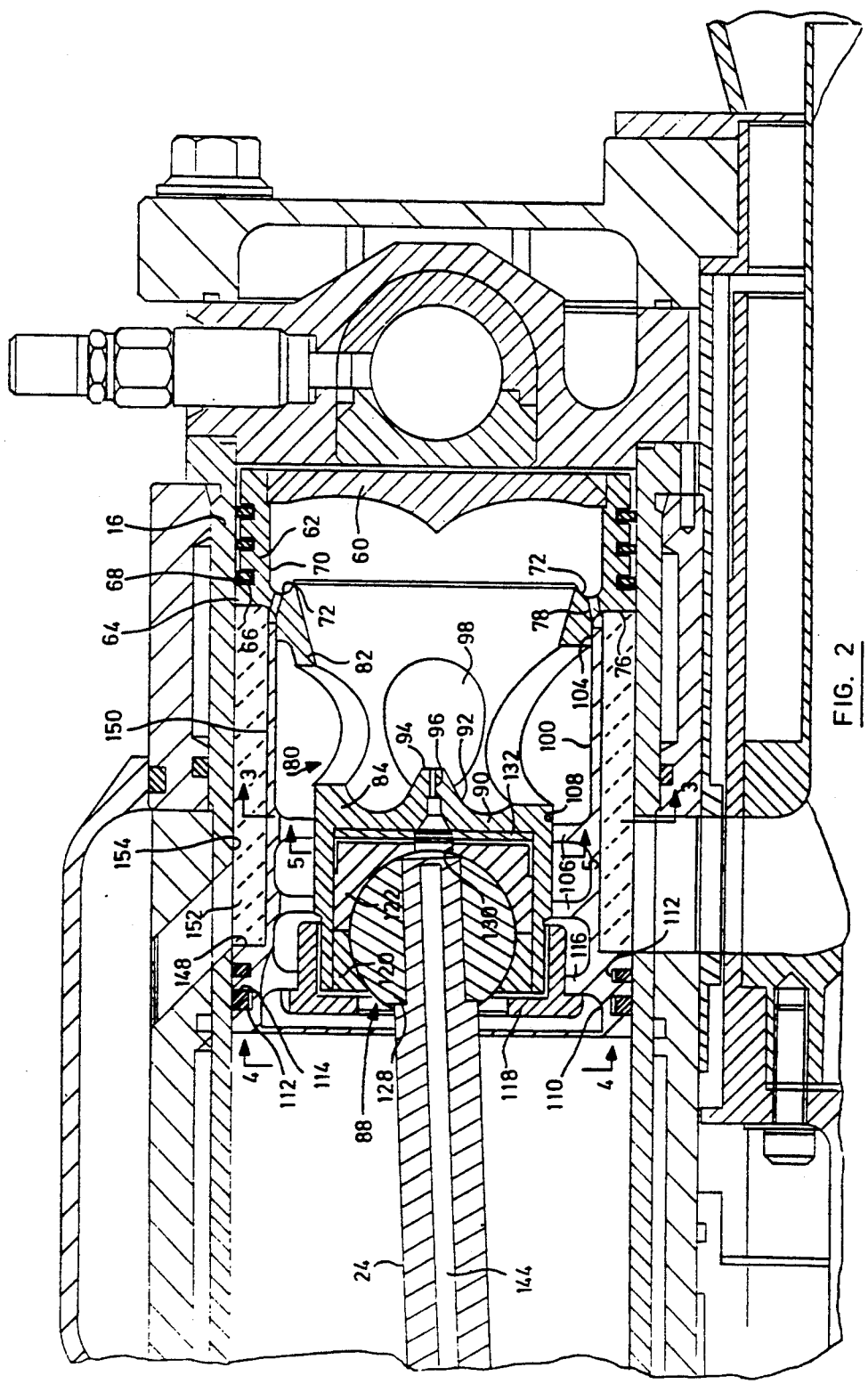
FIG. 2 is an enlarged view in section of a piston shown in FIG. 1.
Figure 3:
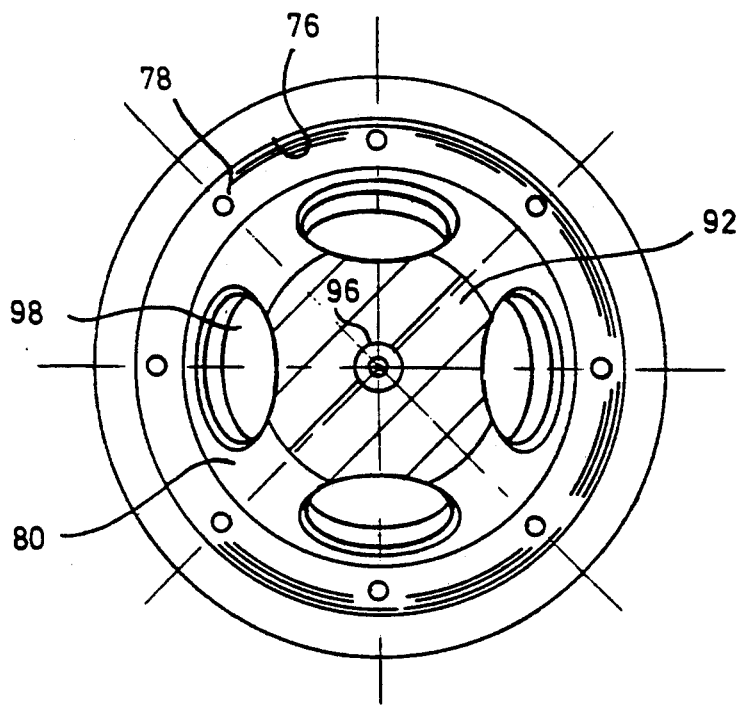
FIG. 3 is a view on the line 3—3 of FIG. 2.
Figure 4:
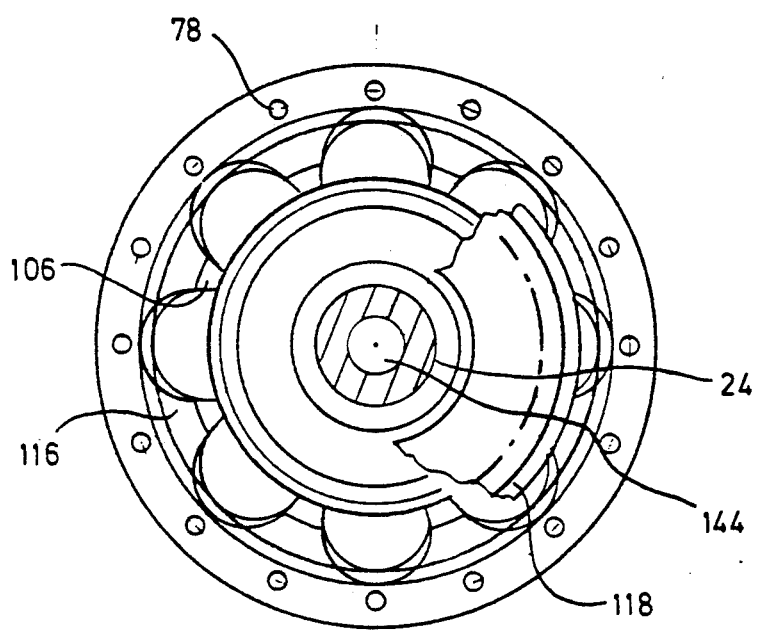
FIG. 4 is a view on the line 4—4 of FIG. 2.

As can best be seen in FIG. 2, each of the pistons 22 includes a piston crown 60 with a peripheral cylindrical wall 62 depending from the crown 60. The crown 60 is welded to the upper edge of the wall 62 to provide a unitary construction between the crown and wall. The wall 62 has a radially outer surface 64 which tapers radially inwardly toward the crown 60. The taper is in the order of one-half degree from parallel so that the clearance between the wall 62 adjacent to the crown is greater than that away from the crown. Circumferential grooves 66 are formed in the outer surface 64 of the wall 62 and each carry a piston ring 68 described in further detail below. The wall 62 includes a radially inner surface 70 which is undercut as indicated at 72 to provide a circumferential gallery directed toward the underside 74 of the crown 60. The radially outer surface 64 terminates at an end wall 76 positioned adjacent the undercut 72 and a series of passages 78 extend between the undercut 72 and the radially inner portion of the end wall 76.

The cylindrical wall 62 is integrally formed with a bearing support structure 80 which intersects the wall 62 adjacent the undercut 72. The support structure 80 includes a conical shell 82 that extends inwardly to a cylindrical housing 84 and has oval apertures 98 to allow communication between the inside and outside of the shell 82. The housing 84 includes a recess 86 directed away from the crown 60 to receive a bearing assembly 88. The recess 86 has an end wall 90 whose outer surface 92 is directed toward the underside 74 of the crown 60. The outer wall 92 is formed with a central cusp 94 with a bore 96 extending from the cusp to the recess 86. The bore 96 provides a nozzle to direct fluid from the recess 86 toward the crown 60 at a relatively high velocity.

The conical shell 82 is circumscribed by a cylindrical support 100 that extends from the end wall 76 of the cylindrical wall 62 and past the housing 84. The upper end 102 of the cylindrical support rests on a cylindrical outer surface 104 of the support structure 80 and at the opposite end, has radially inwardly directed fingers 106 that engage the cylindrical outer surface 108 of the housing 84.

The support 100 is integrally formed with a skirt 110 which has a pair of circumferential grooves 112 on its radially outer surface. The grooves 112 carry piston rings 114 that will be described in further detail below.

The skirt 110 is formed with radially inwardly extending fingers 116 similar to the fingers 106 but engaging the outer surface of a retaining nut 118. The nut 118 is threaded onto the outer surface of the housing 84 and retains the bearing assembly 88 within the recess 86.

The bearing assembly 88 comprises a pair of cylindrical shells 120,122, each having a part spherical cavity 124,126, respectively. The shells 120,122 are formed from a suitable material such as graphite, bronze or a sintered metal composition and snugly encompass a ball-end 128 formed at one end of the connecting rod 24. The shell 122 has a central bore 130 aligned with the bore 96 and is separated from the end wall 90 of the recess 86 by a thrust bearing 132. The thrust bearing 132 is formed with a pair of transverse grooves 134 (FIG. 5) that provide a supply of oil across the face of the thrust bearing 132 to provide a hydrodynamic bearing between the shell 121 and the support structure 80.

As can best be seen in FIG. 1, the connecting rod 24 is pivotally connected to the wobble gear 26 by means of a ball joint assembly 136. The ball joint assembly 136 includes a ball 138 attached to the connecting rod 24 and a graphite shell 140 having a part spherical cavity 142 to receive the ball 138. The connecting rod 24 also is provided with a central longitudinal bore 144 that is aligned with the central bore 130 in the shell 122 and with a similar central bore 146 in the shell 140. The bore 146 is connected to an internal passageway 148 extending through the wobble gear 26 and crankshaft 28 that delivers a supply of oil through the passageway 148 along the connecting rods and to the recess 86 as the pistons reciprocate.

It will be noted from FIG. 2 that the cylindrical support 100 extends between the end wall 76 and a radial face 148 on the cylindrical wall 62 and skirt 110 respectively to define an annular recess 150. A cylindrical sleeve 152 is located in the recess between the wall 76 and face 148 and is supported at its radially inner surface by the cylindrical support 100. The sleeve 152 is formed from a material having an open pore structure that may be impregnated with oil. Suitable materials are graphite or bronze. The radially outer surface 154 of the sleeve 152 provides a bearing surface against the radially inner surface of the liner 16 to support the piston 22 during reciprocation. The oil impregnated graphite of the sleeve 152 provides a low coefficient of friction between the liner 16 and the piston 22 and at the same time provides a relatively large bearing area to maintain the piston 22 aligned within the liner 16.

The radially inner apex of the sleeve 152 overlies the passages 78 so that oil located in the undercut 72 may pass through the passages 78 and into the matrix of the sleeve 152 to maintain the matrix in a saturated condition.

Because of the deposition of oil on the surface of the liner 16 from the sleeve 152, it is preferable to use a piston ring arrangement that is shown more fully in FIG. 6. The piston rings 68a,68b located in the grooves 66 closest to the crown 60 have squared faces 156 engaging the liner 16. The principal purpose of the rings 68a and 68b is to provide a gas seal to inhibit the flow of combustion products past the cylindrical wall 62. The third ring in the cylindrical wall 62 indicated at 68c has an undercut face 158 so that the trailing edge 160 provides a line contact with the wall of the liner 16. The purpose of the ring 68c is to remove the oil film from the liner wall as the piston descends, i.e. moves away from the head 20 to prevent the oil from burning during the combustion process.

The rings 114 in the skirt 110 are utilized essentially as oil control rings The first ring 114a has a square outer face 162 and is relieved at the radially inner edge as indicated at 163 to permit a slight rocking movement within the groove 112. The rings 114b and 114c are located in a common groove 112 and operate in tandem during reciprocation of the piston 22. The ring 114b has a tapered outer face 164 that acts to remove oil from the liner 16 as the piston 22 moves away from the cylinder head 20. The oil removed from the liner passes into the groove 112 and through an internal passageway 166 in the skirt and into the cylinder 18 below the piston. The piston ring 114c acts during movement of the piston 22 toward the cylinder head 20 and has a hooked leading edge 168 that removes the oil from the liner as the piston advances. Again, the oil removed passes through the internal passageway 166 and into the cylinder 18. The piston rings 114b and 114c thus act as a complimentary pair of rings to remove oil from the surface of the liner and pump it through the internal passageway 166.

It will be noted that the piston 22 may be readily assembled by locating the sleeve 152 on the cylindrical support 100 and then locating the support on the outer surface 104 of the support structure 80. At the same time the housing 84 is supported by the fingers 106 so that a stable support is provided for the housing. The piston components are retained by the nut 118 so that the sleeve 152 is supported radially and longitudinally by the cylindrical wall 62 skirt 110 and cylindrical support 100.

In operation, the oil supply through the bore 144 in the connecting rod 24 is projected onto the underside 74 of the crown 60 through the bore 96 where it removes heat from the crown region. The removal of heat elevates the temperature of the oil which is dispersed within the piston and some of which is collected in the undercut 72 to form an oil supply gallery. The oil is then available for replenishing the matrix structure of the sleeve 152 through the internal passages 78 and surplus oil flows back through the apertures in the conical shell 82, past the fingers 106,116 and into the cylinder. The high temperatures encountered adjacent the piston rings 68 effectively superheat oil collected in the gallery 72, thereby facilitating its absorption into the sleeve 152.

The crown 60 may be formed from a high temperature alloy material to resist the temperatures imposed during the combustion process. Conveniently, the crown 60 may be die stamped from a sheet of superalloy and welded to the steel wall 62. The skirt and cylindrical support 100 are conveniently made from aluminum to reduce the mass of the piston as they are not subjected to the elevated temperatures. Moreover, due to the provision of the sleeve 152, the skirt area is not subjected to the side loads which would otherwise require a wear-resistant material in the skirt 110. The use of the porous sleeve 152 insures that a continuous supply of lubricating oil is available between the piston and the sleeve to facilitate reciprocation of the piston 22 within the cylinder. However, the position of the cylindrical wall and the piston rings ensures that that bearing material is not subjected to the harsh environment of the combustion products.

The location of the bearing housing 84 within the support 100 also protects the bearing assembly 88 from the combustion products. This is particularly beneficial when the piston is used in a two-cycle engine where the piston moves across the intake and exhaust ports.

The embodiment described contemplates the bearing material as a self-supporting sleeve. However, in mass production it may be preferred to provide a roughened outer surface for the support 100 and deposit a graphite bearing material onto the roughened surface. In this way, the bearing material does not need to be self-supporting and may have a thickness as low as ⅛ inch. After deposition, the graphite may be ground to a finished dimension.

We claim:

1. A piston for an internal combustion engine comprising a crown, a cylindrical wall extending around the crown and depending therefrom, at least one circumferential groove in said cylindrical wall to carry a piston ring for sealing against a wall of a cylinder containing said piston, a cylindrical support member disposed radially inwardly of said cylindrical wall and extending axially along said piston to an annular skirt portion having at least one circumferential groove therein to carry a piston ring for sealing against said cylinder wall, a bearing support connected to said cylindrical wall and located within said support member to accommodate a bearing for connecting said piston to a connecting rod and a cylindrical bearing member formed from a bearing material located on said support member and extending between said cylindrical wall and said skirt, said cylindrical bearing member having a radially outer surface engagable with said cylinder wall to support said piston for sliding movement within said cylinder.

2. The piston according to claim 1 wherein oil is supplied to said bearing material.

3. The piston according to claim 2 wherein said oil is supplied to said bearing material through passages at an intersection of said cylindrical wall and said support member.

4. The piston according to claim 2 wherein a nozzle is provided within said support member to direct oil on to said crown.

5. The piston according to claim 4 wherein a portion of oil impinging on said crown is supplied to said bearing material.

6. The piston according to claim 5 wherein a gallery is provided at an intersection of said bearing support and said peripheral wall to receive and hold oil after impingement on said crown.

7. The piston according to claim 6 wherein passages extend from said gallery to said bearing material.

8. The piston according to claim 4 wherein said nozzle is carried by said bearing support.

* * * * *